(12) United States Patent
Zelesky et al.

(10) Patent No.: US 11,268,401 B2
(45) Date of Patent: Mar. 8, 2022

(54) AIRFOIL ASSEMBLY FORMED OF HIGH TEMPERATURE-RESISTANT MATERIAL

(71) Applicant: United Technologies Corporation, Hartford, CT (US)

(72) Inventors: Mark F. Zelesky, Bolton, CT (US); Bryan P. Dube, Columbia, CT (US); Jesse R. Christophel, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 727 days.

(21) Appl. No.: 15/022,039

(22) PCT Filed: Aug. 21, 2014

(86) PCT No.: PCT/US2014/051986
§ 371 (c)(1),
(2) Date: Mar. 15, 2016

(87) PCT Pub. No.: WO2015/041794
PCT Pub. Date: Mar. 26, 2015

(65) Prior Publication Data
US 2016/0230593 A1 Aug. 11, 2016

Related U.S. Application Data

(60) Provisional application No. 61/878,782, filed on Sep. 17, 2013.

(51) Int. Cl.
*F01D 25/00* (2006.01)
*F01D 5/28* (2006.01)
(Continued)

(52) U.S. Cl.
CPC .......... *F01D 25/005* (2013.01); *F01D 5/189* (2013.01); *F01D 5/284* (2013.01); *F01D 9/041* (2013.01);
(Continued)

(58) Field of Classification Search
None
See application file for complete search history.

(56) References Cited

U.S. PATENT DOCUMENTS

| 4,563,128 A | 1/1986 | Rossmann | |
|---|---|---|---|
| 5,630,700 A * | 5/1997 | Olsen | F01D 5/189 |
| | | | 415/134 |

(Continued)

FOREIGN PATENT DOCUMENTS

| EP | 1626162 A1 | 2/2006 |
|---|---|---|
| JP | 05321602 | 12/1993 |
| JP | 2012219702 | 11/2012 |

OTHER PUBLICATIONS

Miller et al., Thermal Barrier Coating for Gas Turbine and Diesel Engines, NASA (Year: 1989).*

(Continued)

*Primary Examiner* — Edwin Kang
(74) *Attorney, Agent, or Firm* — Carlson, Gaskey & Olds, P.C.

(57) ABSTRACT

An airfoil assembly includes an airfoil that has an exterior wall that defines an interior cavity. The exterior wall extends between a leading end and a trailing end and an open inboard end and an open outboard end. The exterior wall is formed of a high temperature-resistant material selected from refractory metal-based alloys, ceramic-based material or combinations thereof. A support frame extends in the interior cavity and protrudes from the interior cavity through at least one of the open inboard end and the open outboard end.

2 Claims, 5 Drawing Sheets

(51) Int. Cl.
*F01D 5/18* (2006.01)
*F01D 9/04* (2006.01)
*F01D 25/12* (2006.01)
*F02C 3/04* (2006.01)

(52) U.S. Cl.
CPC ................ *F01D 25/12* (2013.01); *F02C 3/04* (2013.01); *F05D 2220/32* (2013.01); *F05D 2240/12* (2013.01); *F05D 2240/35* (2013.01); *F05D 2260/201* (2013.01); *F05D 2300/17* (2013.01); *F05D 2300/176* (2013.01); *F05D 2300/20* (2013.01); *F05D 2300/5023* (2013.01)

(56) References Cited

U.S. PATENT DOCUMENTS

| | | | |
|---|---|---|---|
| 5,693,156 | A | 12/1997 | Berczik |
| 6,000,906 | A * | 12/1999 | Draskovich ........... F01D 5/3084 415/189 |
| 7,364,405 | B2 | 4/2008 | Cunha et al. |
| 8,206,098 | B2 | 6/2012 | Prill et al. |
| 8,366,392 | B1 | 2/2013 | Liang |
| 2006/0034679 | A1* | 2/2006 | Harding ................. F01D 5/189 415/115 |
| 2006/0228211 | A1* | 10/2006 | Vance ...................... F01D 5/14 415/200 |
| 2009/0324397 | A1* | 12/2009 | Caruso ..................... F02C 6/08 415/178 |
| 2010/0068034 | A1* | 3/2010 | Schiavo ................. F01D 5/189 415/115 |
| 2010/0080687 | A1 | 4/2010 | Vance |
| 2012/0301303 | A1 | 11/2012 | Alvanos et al. |
| 2013/0315725 | A1* | 11/2013 | Uechi ..................... F01D 5/189 415/208.1 |

OTHER PUBLICATIONS

International Search Report for PCT Application No. PCT/US2014/051986 completed Dec. 1, 2014.
International Preliminary Report on Patentability for PCT Application No. PCT/US2014/051986 completed Mar. 22, 2016.
Supplementary European Search Report for European Patent No. 14845469.7 completed Mar. 21, 2017.

* cited by examiner

AIRFOIL ASSEMBLY FORMED OF HIGH TEMPERATURE-RESISTANT MATERIAL

CROSS-REFERENCE TO RELATED APPLICATION

This application claims priority to U.S. Provisional Application No. 61/878,782, filed Sep. 17, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil assembly according to an example of the present disclosure includes an airfoil having an exterior wall that defines an interior cavity. The exterior wall extends between a leading end and a trailing end and an open inboard end and an open outboard end. The exterior wall is formed of a high temperature-resistant material selected from the group consisting of refractory metal-based alloys, ceramic-based material and combinations thereof. A support frame extends in the interior cavity and protrudes from the interior cavity through at least one of the open inboard end and the open outboard end.

In a further embodiment of any of the foregoing embodiments, the high temperature-resistant material is the refractory metal-based alloy.

In a further embodiment of any of the foregoing embodiments, the refractory metal-based alloy is a molybdenum-based alloy.

In a further embodiment of any of the foregoing embodiments, the high temperature-resistant material includes the refractory metal-based alloy and the ceramic-based material.

In a further embodiment of any of the foregoing embodiments, the airfoil has distinct segments including a leading end section, a trailing end section and an intermediate section between the leading end section and the trailing end section, at least two of the leading end section, the trailing end section and the intermediate section being different ones of the high temperature-resistant material.

In a further embodiment of any of the foregoing embodiments, at least one spacer is located between the airfoil and the support frame.

In a further embodiment of any of the foregoing embodiments, the at least one spacer is a material selected from the group consisting of cobalt metal and cobalt-based alloy.

In a further embodiment of any of the foregoing embodiments, the at least one spacer is located in the interior cavity.

In a further embodiment of any of the foregoing embodiments, the at least one spacer is located outside of the interior cavity and is adjacent a portion of the support frame that protrudes from the interior cavity.

In a further embodiment of any of the foregoing embodiments, a portion of the support frame that protrudes from the interior cavity includes a hook that is configured to secure the support frame to a case.

In a further embodiment of any of the foregoing embodiments, a portion of the support frame in the interior cavity includes impingement cooling features that are configured to direct cooling fluid in a direction toward an interior surface of the exterior wall.

In a further embodiment of any of the foregoing embodiments, first and second end wall platforms are arranged, respectively, at the open inboard end and the open outboard end.

In a further embodiment of any of the foregoing embodiments, the first and second end wall platforms are formed of the high temperature-resistant material.

In a further embodiment of any of the foregoing embodiments, a spring member is located between the support frame and the airfoil.

In a further embodiment of any of the foregoing embodiments, the airfoil and the support frame are free of direct contact with each other.

In a further embodiment of any of the foregoing embodiments, the support frame is a nickel-based alloy.

In a further embodiment of any of the foregoing embodiments, at least one of the exterior wall and the support frame includes a barrier coating.

In a further embodiment of any of the foregoing embodiments, the exterior wall includes a plurality of cooling holes.

A gas turbine engine according to an example of the present disclosure includes a compressor section, a combustor in fluid communication with the compressor section, and a turbine section in fluid communication with the combustor. The turbine section includes a vane assembly comprising an airfoil having an exterior wall defining an interior cavity. The exterior wall extends between a leading end and a trailing end and an open inboard end and an open outboard end. The exterior wall is formed of a high temperature-resistant material selected from the group consisting of refractory metal-based alloys, ceramic-based material and combinations thereof. A support frame extends in the interior cavity and protrudes from the interior cavity through at least one of the open inboard end and the open outboard end.

A method of managing stress on an airfoil according to an example of the present disclosure includes generating a load on the airfoil and transferring the load from the airfoil to the support frame to reduce stress on the airfoil.

In a further embodiment of any of the foregoing embodiments, the load is transferred from the airfoil and through the support frame to a case structure attached to the support frame.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
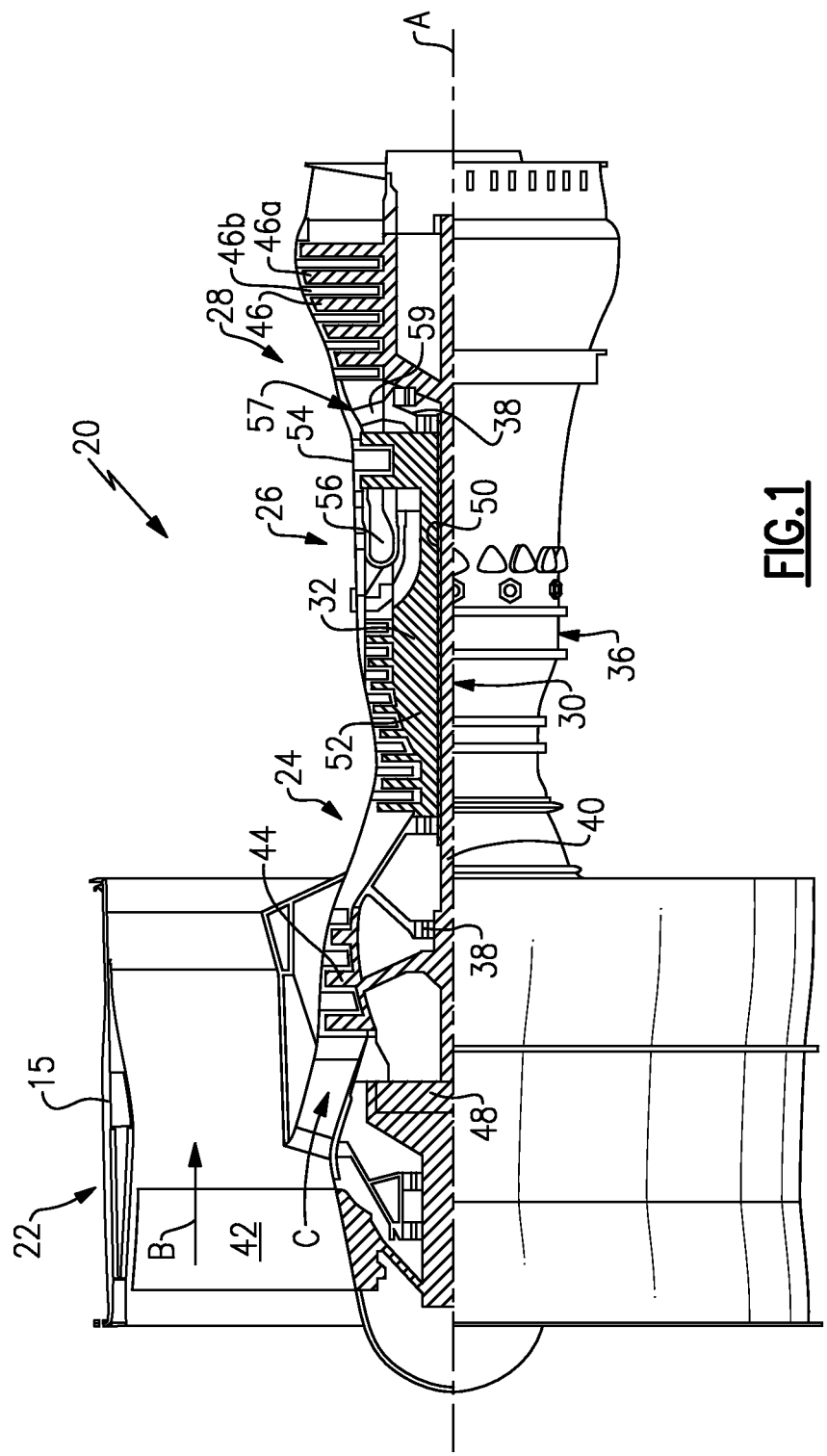
FIG. 1 illustrates an example gas turbine engine.

FIG. 1 schematically illustrates a gas turbine engine 20. The gas turbine engine 20 is disclosed herein as a two-spool turbofan that incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it is to be understood that the concepts described herein are not limited to use with two-spool turbofans and the teachings can be applied to other types of turbine engines, including three-spool architectures and ground-based engines.

The engine 20 includes a low speed spool 30 and a high speed spool 32 mounted for rotation about an engine central axis A relative to an engine static structure 36 via several bearing systems, shown at 38. It is to be understood that various bearing systems at various locations may alternatively or additionally be provided, and the location of bearing systems may be varied as appropriate to the application.

The low speed spool 30 includes an inner shaft 40 that interconnects a fan 42, a low pressure compressor 44 and a low pressure turbine 46. The inner shaft 40 is connected to the fan 42 through a speed change mechanism, which in this example is a gear system 48, to drive the fan 42 at a lower speed than the low speed spool 30. The high speed spool 32 includes an outer shaft 50 that interconnects a high pressure compressor 52 and high pressure turbine 54.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A combustor 56 is arranged between the high pressure compressor 52 and the high pressure turbine 54. A mid-turbine frame 57 of the engine static structure 36 is arranged between the high pressure turbine 54 and the low pressure turbine 46. The mid-turbine frame 57 further supports bearing system 38 in the turbine section 28. The inner shaft 40 and the outer shaft 50 are concentric and rotate via, for example, bearing systems 38 about the engine central axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 can be varied. For example, gear system 48 may be located aft of combustor section 26 or even aft of turbine section 28, and fan section 22 may be positioned forward or aft of the location of gear system 48.

The engine 20 in one example is a high-bypass geared engine. In a further example, the engine 20 has a bypass ratio that is greater than about six (6), with an example embodiment being greater than about ten (10), the gear system 48 is an epicyclic gear train, such as a planet or star gear system, with a gear reduction ratio of greater than about 2.3, and the low pressure turbine 46 has a pressure ratio that is greater than about five (5). In one disclosed embodiment, the bypass ratio is greater than about ten (10:1), the fan diameter is significantly larger than that of the low pressure compressor 44, and the low pressure turbine 46 has a pressure ratio that is greater than about five (5). Low pressure turbine 46 pressure ratio is pressure measured prior to inlet of low pressure turbine 46 as related to the pressure at the outlet of the low pressure turbine 46 prior to an exhaust nozzle. The gear system 48 can be an epicycle gear train, such as a planet or star gear system, with a gear reduction ratio of greater than about 2.3:1. It is to be understood, however, that the above parameters are only exemplary and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

The fan 42, in one non-limiting embodiment, includes less than about twenty-six fan blades. In another non-limiting embodiment, the fan section 22 includes less than about twenty fan blades. Moreover, in a further example, the low pressure turbine 46 includes no more than about six turbine rotors. In another non-limiting example, the low pressure turbine 46 includes about three turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The turbine section 28 of the engine 20 includes airfoil assemblies 46a and 46b. For example, the airfoil assembly 46a is a rotatable turbine blade assembly and the airfoil assembly 46b is a static vane assembly.

As can be appreciated, the turbine section 28 operates under extreme elevated temperatures. In this regard, cooling fluid, such as relatively cool air from the compressor section 24, can be provided to various components in the turbine section 28 to maintain a desirable temperature. However, the bleeding of air from the compressor section 24 penalizes engine efficiency. Thus, if the use of the bleed air can be reduced or even eliminated, the engine 20 can be significantly more efficient. For example, even fractional gains in efficiency translate to significant savings in overall fuel burn. As will be described in more detail below, the airfoil assembly 46b utilizes high temperature-resistant materials in order to mitigate, or even eliminate, the need for bleed air cooling. Although high temperature-resistant materials may generally be known, there is a difficulty in incorporating these materials into an airfoil assembly because, although such materials are resistant to elevated temperatures, corrosion, erosion and alike, the enhancement of some properties comes at the loss of other properties, such as strength or toughness. Therefore, there is a considerable challenge in using such materials in an airfoil assembly.

Figure 2:
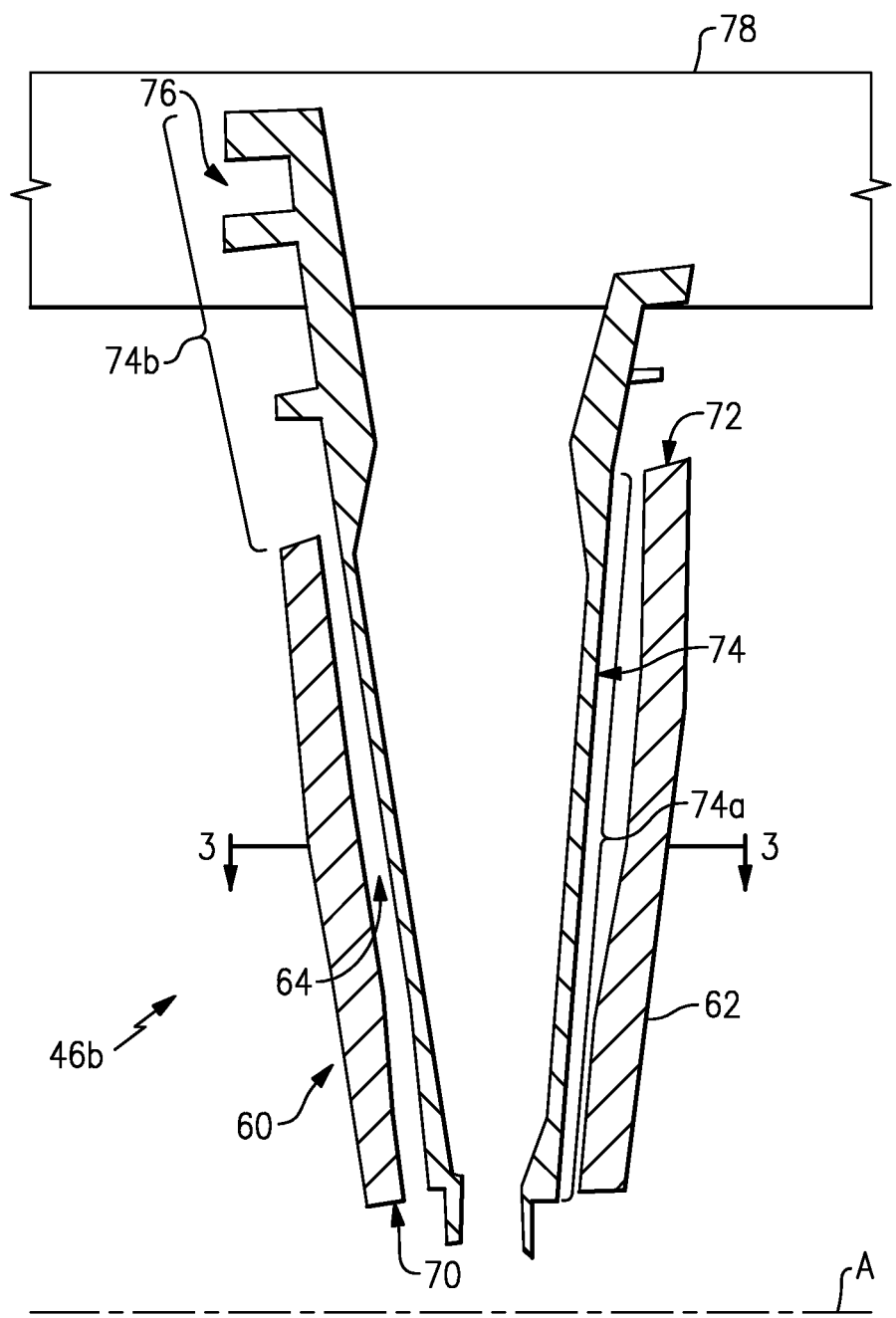
FIG. 2 illustrates a sectioned view of an airfoil assembly of the gas turbine engine of FIG. 1.
Figure 3:
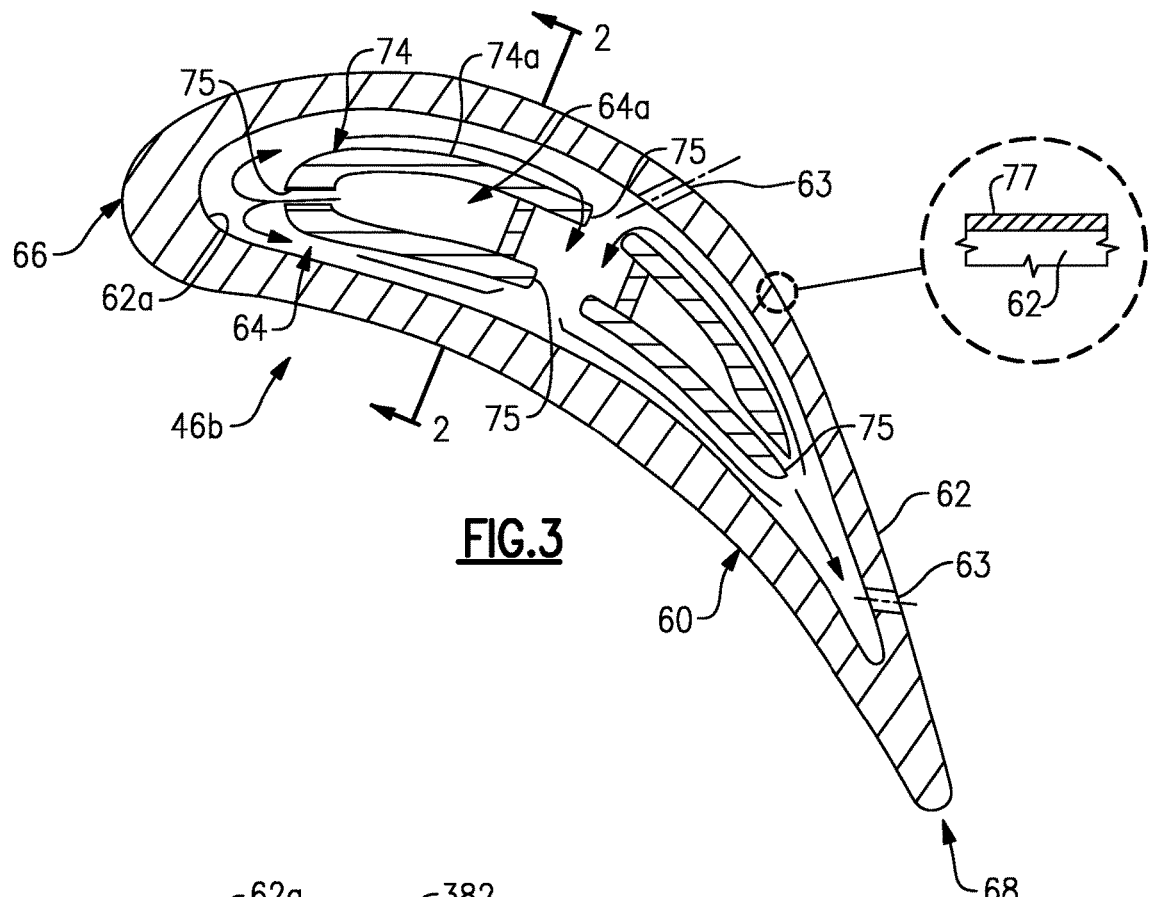
FIG. 3 illustrates a sectioned view of the airfoil assembly of FIG. 2.

FIG. 2 shows a sectioned, isolated view of the airfoil assembly 46b. The airfoil assembly 46b includes an airfoil 60. The airfoil 60 has an aerodynamic, wing-like shape that provides a lift force via Bernoulli's Principle such that suction and pressure are produced on opposing sides of the airfoil. FIG. 3 shows a further sectioned view of the airfoil assembly 46b according to the section line shown in FIG. 2. Referring to FIGS. 2 and 3, the airfoil 60 includes an exterior wall 62 that defines an interior cavity 64. The exterior wall 62 extends between a leading end 66 and a trailing end 68 and an open inboard end 70 and an open outboard end 72. As can be appreciated, the open inboard end 70 is a radially inner end of the airfoil 60 and the open outboard end 72 is a radially outer end, relative to the engine central axis, A.

The exterior wall 62 is formed of a high temperature-resistant material that is selected from refractory metal-based alloys, ceramic-based material and combinations thereof. In some examples, the exterior wall 62 includes only the high temperature-resistant material. Optionally, the exterior wall 62 can also include a plurality of film cooling holes 63, the location of which can be modified according to localized cooling requirements.

An example refractory metal-based alloy is molybdenum or a molybdenum-based alloy. Example ceramic-based materials can include monolithic ceramic materials or composite ceramic materials.

The airfoil assembly 46b also includes a support frame 74 that extends in the interior cavity 64 of the airfoil 60. The support frame 74 includes a first portion 74a that is within the interior cavity 64 and a second portion 74b that protrudes from the interior cavity 64 through at least one of the open inboard end 70 and the open outboard end 72. In the illustrated example, the support frame 74 protrudes from the interior cavity 64 through both the open inboard end 70 and the open outboard end 72. It is to be understood, however, that the support frame 74 need not necessarily protrude from both of the ends 70/72.

In the illustrated example, the second portion 74b of the support frame 74 that protrudes from the interior cavity 64 includes a hook 76 that is configured to secure to a case 78 (shown schematically). Although not shown, the case 78 can include a corresponding mating feature that is configured to interlock with the hook 76.

The support frame 74 is formed of a different material than the airfoil 60. For example, the exterior wall 62 of the airfoil 60 is directly exposed to hot gases in the core gas path C and therefore is formed of the high temperature-resistant material. However, the support frame 74 is not directly exposed to the hot gases and thus can be made of a material that has relatively lower temperature resistance than the high temperature-resistant material. In one example, the support frame 74 is formed of a superalloy material, such as but not limited to, nickel-based alloys. The superalloys can be cast with a single crystal structure, although other structures could also be used. Superalloys are also highly temperature resistant, but may not have the level of temperature resistance that the high temperature-resistant material of the airfoil 60 has. However, many nickel-based alloys have a sufficient level of temperature resistance to withstand any hot gases that might leak through the airfoil 60 into the interior cavity 64. In further examples, the exterior wall 62, the support frame 74 or both can be coated with a barrier coating 77, such as an environmental barrier coating, a thermal barrier coating or both. A representative view of the barrier coating 77 on the exterior wall 62 is shown in enlarged view in FIG. 2.

As shown in FIG. 3, the first portion 74a of the support frame 74 can include impingement cooling features, generally indicated at reference 75. For example, the first portion 74a of the support frame 74 defines an interior sub-cavity 64a and the impingement cooling features 75 include through-holes between the interior sub-cavity 64a and the surrounding interior cavity 64. Cooling fluid can be provided to the interior sub-cavity 64a such that the impingement cooling features 75 jet streams of the cooling fluid in directions toward interior surfaces 62a of the exterior wall 62. As can be appreciated, the cooling fluid can also circulate inwardly through the impingement cooling features 75 into the interior sub-cavity 64a. Thus, the first portion 74a of the support frame 74 functions as a baffle to mix the cooling fluid within the interior cavity 64 and thus facilitate maintaining the exterior wall 62 at a desired temperature. However, it is also to be appreciated that the high temperature-resistant material of the exterior wall 62 can require a reduced amount of cooling fluid relative to previously used materials or, in some examples, can utilize passive flow-through air or may not require any cooling fluid at all. If no cooling is required, the support frame 74 can exclude impingement cooling features. Additionally, the location and shape of the features 75 can vary from the illustrated example, depending upon the need for cooling at certain locations.

Figure 4:
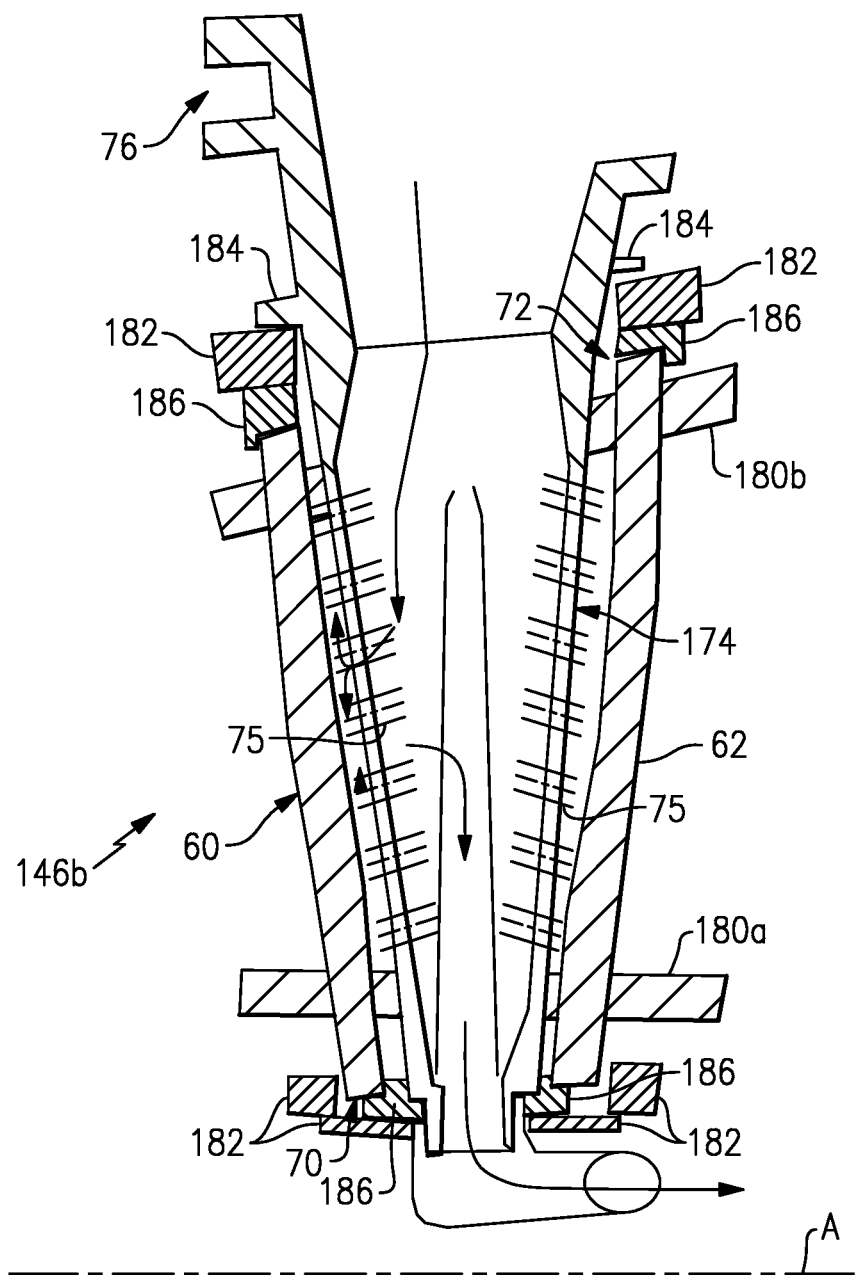
FIG. 4 illustrates another sectioned view of another example airfoil assembly.

FIG. 4 shows another example airfoil assembly 146b. In this disclosure, like reference numerals designate like elements where appropriate and reference numerals with the addition of one-hundred or multiples thereof designate modified elements that are understood to incorporate the same features and benefits of the corresponding elements. In this example, the airfoil assembly 146b additionally includes first and second end wall platforms 180a/180b. As can be appreciated, the first end wall platform 180a is a radially inner platform and the second end wall platform 180b is a radially outer platform, relative to the engine central axis, A. The end wall platforms 180a/180b can be separate, distinct pieces from the airfoil 60 or, alternatively, can be integral with the airfoil 60. If integral, the end wall platforms 180a/180b would be formed of the same high temperature-resistant material as the exterior wall 62. If separate distinct pieces, the end wall platforms 180a/180b can be the same or different high temperature-resistant material than the exterior wall 62 of the airfoil 60. In further examples, the materials forming the end wall platforms 180a/180b are also selected from the refractory metal-based alloys and ceramic-based materials as discussed above.

In this example, and also in the example shown in FIG. 2, the airfoil 60 and the support frame 74 are free of any direct contact with each other. In instances where the material of the support frame 174 is a superalloy and the material of the exterior wall 62 is a refractory metal-based alloy or ceramic-based material, such materials can react with each other if in direct contact. As an example, molybdenum, such as from a molybdenum-based alloy of the exterior wall 62 is reactive with nickel-based alloys. Such reactions may debit the properties of the support frame 174, exterior wall 62 or both. To mitigate, or even eliminate such reactions, at least one spacer 182 is arranged between the airfoil 60 and the support frame 174. In the example shown, one or more spacers are provided between the outboard end 72 of the airfoil and one or more flanges 184 of the support frame 174. The spacer or spacers 182 limit or even eliminate direct contact between the airfoil 60, and optionally also the end wall platforms 180a/180b, and the support frame 174. Alternatively, if there are no material reactions or such reaction are negligible, the airfoil 60 and the support frame 74 can be in direct, intimate contact.

In one example, the spacer or spacers 182 are formed of cobalt metal or cobalt-based alloy. Cobalt metal or cobalt-based alloy is relatively chemically inert with regard to the above-described materials of the support frame 174 and exterior wall 62. Moreover, cobalt metal or cobalt-based alloy has relatively high temperature resistance that is suitable for the environment of the turbine section 28. Thus, at any or all mechanical interfaces between the airfoil 60, end wall platforms 180a/180b, and the support frame 174, a cobalt metal or cobalt-alloy spacer can be used to mechanically separate the reactive materials of the support frame 174 and airfoil 60 and/or end wall platforms 180a/180b.

Optionally, as also shown in FIG. 4, one or more high-temperature seals 186 can be provided between the airfoil 60, and optionally the end wall platforms 180a/180b, and the support frame 174. The high-temperature seals 186 can be made of any of the high temperature-resistant materials described above with respect to the airfoil 60.

Figure 5:
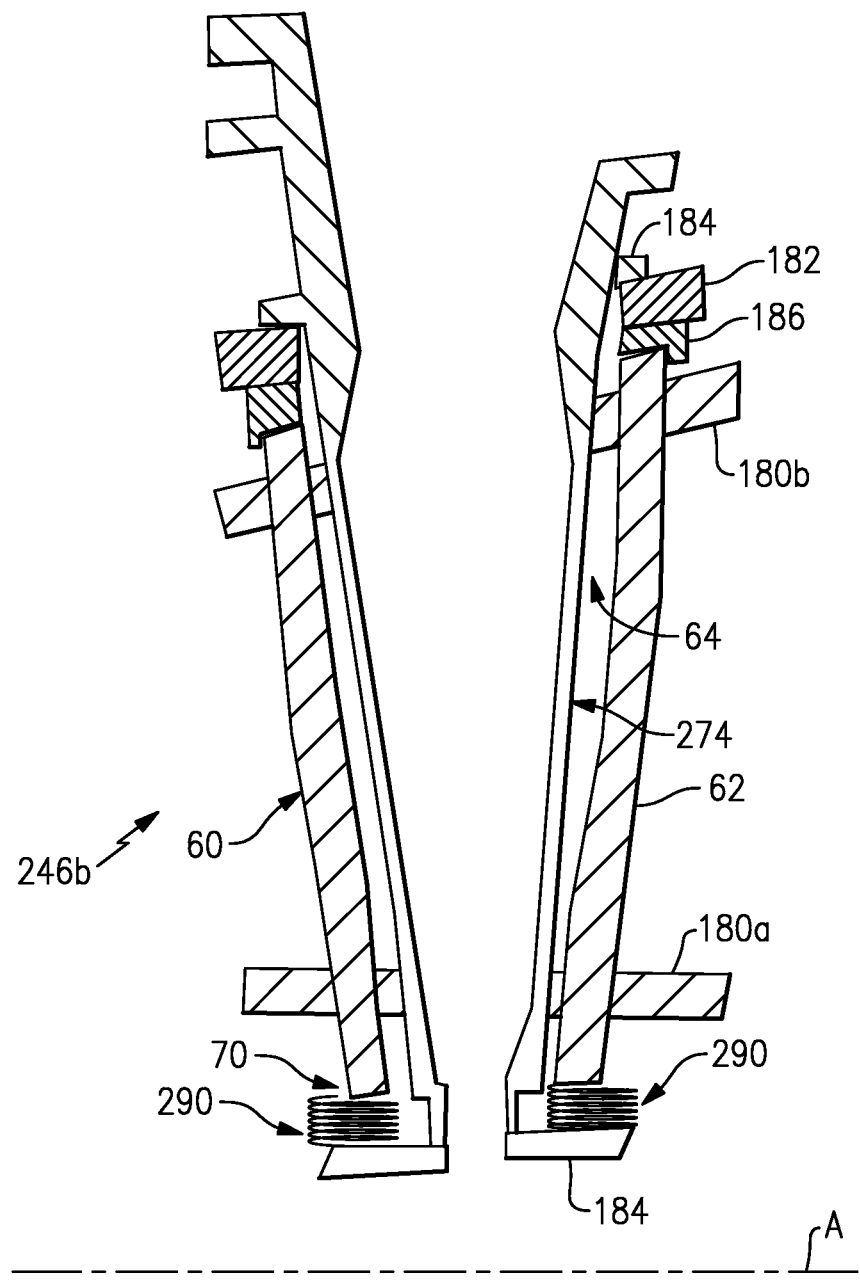
FIG. 5 illustrates a sectioned view of another example airfoil assembly.

FIG. 5 illustrates another example airfoil assembly 246b. In this example, spring members 290 (shown schematically) are used to compress or bias the various components of the airfoil assembly 246b together and provide loading across the high-temperature seal or seals 186. For instance, the spring members 290 are located between flanges 184 of the support frame 274 and engage, in the illustrated example, the inboard end of the airfoil 60. The spring members 290, or additional spring members, may also be used to bias the end wall platforms 180a/180b. The spring members 290 bias the airfoil 60, and optionally the end wall platforms 180a/180b, in a stack against the flanges 184 of the support frame 274. Thus, the airfoil 60 and support frame 274 are not rigidly affixed, but rather there is some play between these components determined, at least in part, by the spring constant selected for the spring members 290. Additionally, since the airfoil assembly 246b is assembled of components of different materials, which have different coefficients of thermal expansion, the spring members 290 also serve to mitigate thermal expansion differences between the different materials of the components. Thus, even if there is a thermal expansion mismatch between the support frame 274, the airfoil 60, the end wall platforms 180a/180b, the high temperature seal 186, and/or the spacer 182, the spring members 290 can be selected to accommodate this mismatch and thus mitigate, or even eliminate, thermally-induced stresses.

Figure 6:
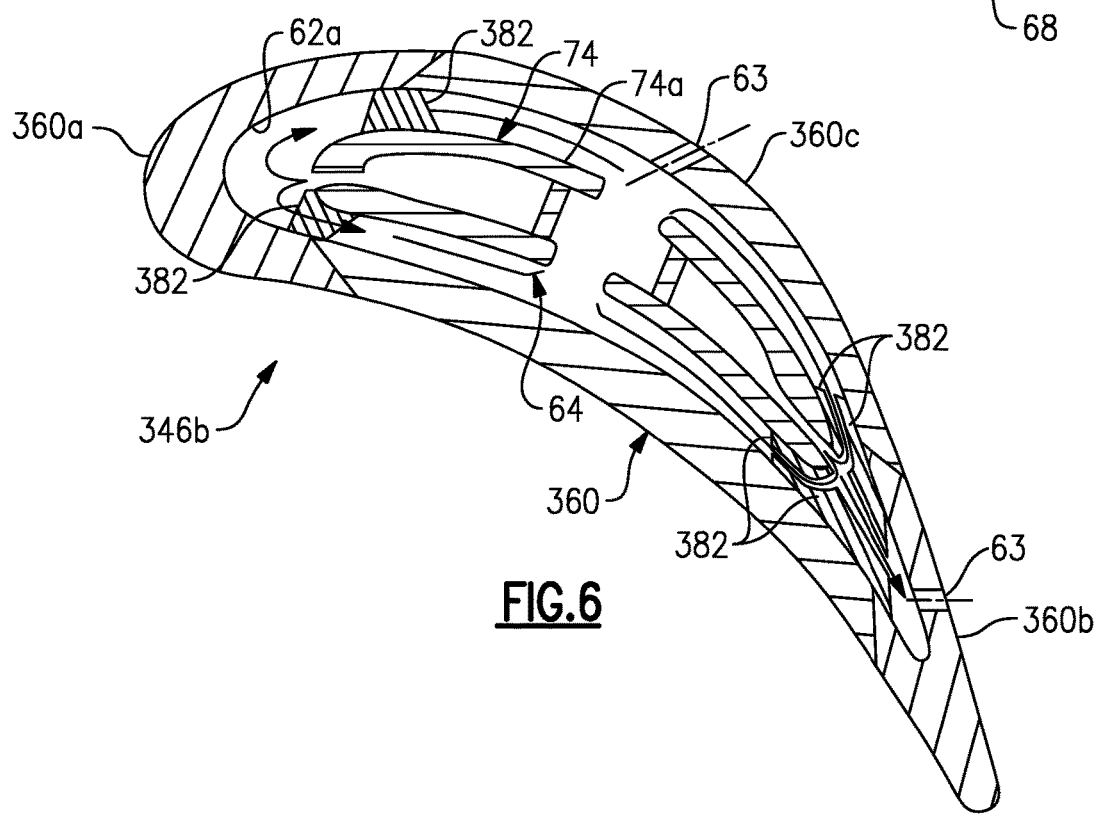
FIG. 6 illustrates a sectioned view of another example airfoil assembly having a segmented airfoil.

FIG. 6 shows another example airfoil assembly 346b. In this example, the airfoil assembly 346b includes an airfoil 360, which is somewhat similar to the airfoil 60 described above. In this example, however, the airfoil 360 has distinct segments including a leading end section 360a, a trailing end section 360b and an intermediate section 360c between the leading and trailing end sections 360a/360b. The term "distinct segments" as used herein refers to segments that are perceptibly distinguishable at an interface or boundary, represented at 361.

The sections 360a/360b/360c are formed of the high temperature-resistant material described above. The high temperature-resistant material selected for each of the sections 360a/360b/360c can be the same or different compositions. However, in one example, at least two of the sections 360a/360b/360c are different ones of the high temperature-resistant materials. In further examples, the sections 360a/360b/360c are each formed of one of the high temperature-resistant materials and are all different from each other in at least one of composition or microstructure.

In one example, the high temperature-resistant material of the leading end section 360a is a refractory metal-based alloy, such as molybdenum metal or molybdenum-based alloy. The high temperature-resistant material of the intermediate section 360c is a ceramic matrix composite, and the high temperature-resistant material of the trailing end section 360b is a monolithic ceramic material. The high temperature-resistant materials of the sections 360a/360b/360c can be selected according to thermal profiles along the airfoil 360, stress requirements, cost factors, and other engineering factors.

Optionally, one or more spacers 382 can be provided in the interior cavity 64. The spacers 382 in this example are located between the first portion 74a of the support frame 74 and the interior surface 62a of the airfoil 360. For example, the spacers 382 are distributed around the periphery of the first section 74a to mechanically support the first section 74a with respect to the airfoil 360. Again, the spacers 382 ensure that there is no direct contact between the support frame 74 and the airfoil 360. As can be appreciated, fewer or additional spacers 382 can be provided as may be appropriate, and the locations of the spacers 382 can be changed from the locations shown.

As discussed above, one challenge in using high temperature-resistant material or materials is that these materials may not have optimal strength and toughness properties for airfoil assemblies. However, the disclosed arrangement of the airfoil 60/360 and support frame 74/174/274 manages stress on an airfoil. In this regard, also disclosed is a method of managing stress on an airfoil. The method includes generating a load on an airfoil, such as airfoil 60/260, and transferring the load from the airfoil to a support frame, such as one of the support frames 74/174/274, to reduce stress on the airfoil. For example, aero-loads can generate loads on the airfoil 60/260. These loads are transferred from the airfoil 60/260 to the support frame 74/174/274, which reacts the load into the attached case 78, to reduce stress on the airfoil 60. In other words, stress on the airfoil 60/260 and exterior wall is reduced, and the support frame 74/174/274 can be formed of a material having greater strength and toughness to bear the aero-loads and other loads on the airfoil 60.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
   a compressor section;
   a combustor in fluid communication with the compressor section; and
   a turbine section in fluid communication with the combustor, the turbine section including a vane assembly comprising an airfoil having an exterior wall defining an interior cavity, the exterior wall extending between a leading end and a trailing end and between an open inboard end and an open outboard end, the exterior wall being formed of a material selected from the group consisting of refractory metal-based alloys, ceramic-based material and combinations thereof, a support frame extending in the interior cavity and protruding from the interior cavity through at least one of the open inboard end and the open outboard end, and at least one spacer located between the airfoil and the support frame, the at least one spacer arranged between the open outboard end of the airfoil and a first flange of the support frame, and a spring member located between the open inboard end of the airfoil and a second flange of the support frame.

2. The gas turbine engine of claim 1, further comprising first and second end wall platforms arranged, respectively, at the open inboard end and the open outboard end, wherein the exterior wall has a radial extent that extends past the first and second end wall platforms.

* * * * *